United States Patent [19]
Klingelhofer et al.

[11] Patent Number: 4,901,150
[45] Date of Patent: Feb. 13, 1990

[54] AUTOMATIC NOISE REDUCTION FOR INDIVIDUAL FREQUENCY COMPONENTS OF A SIGNAL

[75] Inventors: Marc Klingelhofer, Fremont; Vinson R. Perry, San Carlos, both of Calif.

[73] Assignee: Sony Corporation, Tokyo, Japan

[21] Appl. No.: 274,820

[22] Filed: Nov. 22, 1988

[51] Int. Cl.$^4$ .............................................. H04N 5/21
[52] U.S. Cl. ...................................... 358/167; 358/36; 455/296; 455/303; 455/308
[58] Field of Search .......................... 358/167, 36, 905; 455/296, 303, 304, 305, 308, 309

[56] References Cited

U.S. PATENT DOCUMENTS

| | | | |
|---|---|---|---|
| 4,044,381 | 8/1977 | Shimano | 358/167 |
| 4,167,755 | 9/1979 | Nagumo | 358/167 |
| 4,504,864 | 3/1985 | Anastassiou | 358/167 |
| 4,554,514 | 11/1985 | Whartenby | 455/296 |
| 4,698,680 | 10/1987 | Lewis | 358/905 |

*Primary Examiner*—Tommy P. Chin
*Attorney, Agent, or Firm*—Philip M. Shaw, Jr.

[57] ABSTRACT

A method and system for separating a noise signal into frequency components, then automatically performing noise reduction on the individual frequency components, and then recombining the processed frequency components to generate an output noise signal. The noise reduction parameters for each frequency component may be independently set. The output noise signal generated during performance of the invention will typically be recombined with a signal (such as a television signal) from which the input noise signal for the invention was originally extracted. In a preferred embodiment, the input noise signal supplied to the system of the invention is generated by subtracting two adjacent frames of a television signal. In a preferred embodiment, the system of the invention includes: circuitry for implementing a Walsh-Hadamard transform to separate the input noise signal into a set of frequency components; a set of automatic gain controlled amplifiers for independently performing noise reduction on each frequency component; and a noise component collator for combining the processed frequency components to generate a "component controlled noise signal". Each automatic gain controlled amplifier is independently controlled in response to a feedback signal representing the noise characteristics of a different frequency component of the input noise signal. Preferably, the system of the invention also includes a gain controlled amplifier for transforming the component controlled noise signal into a gain controlled noise output signal.

27 Claims, 1 Drawing Sheet

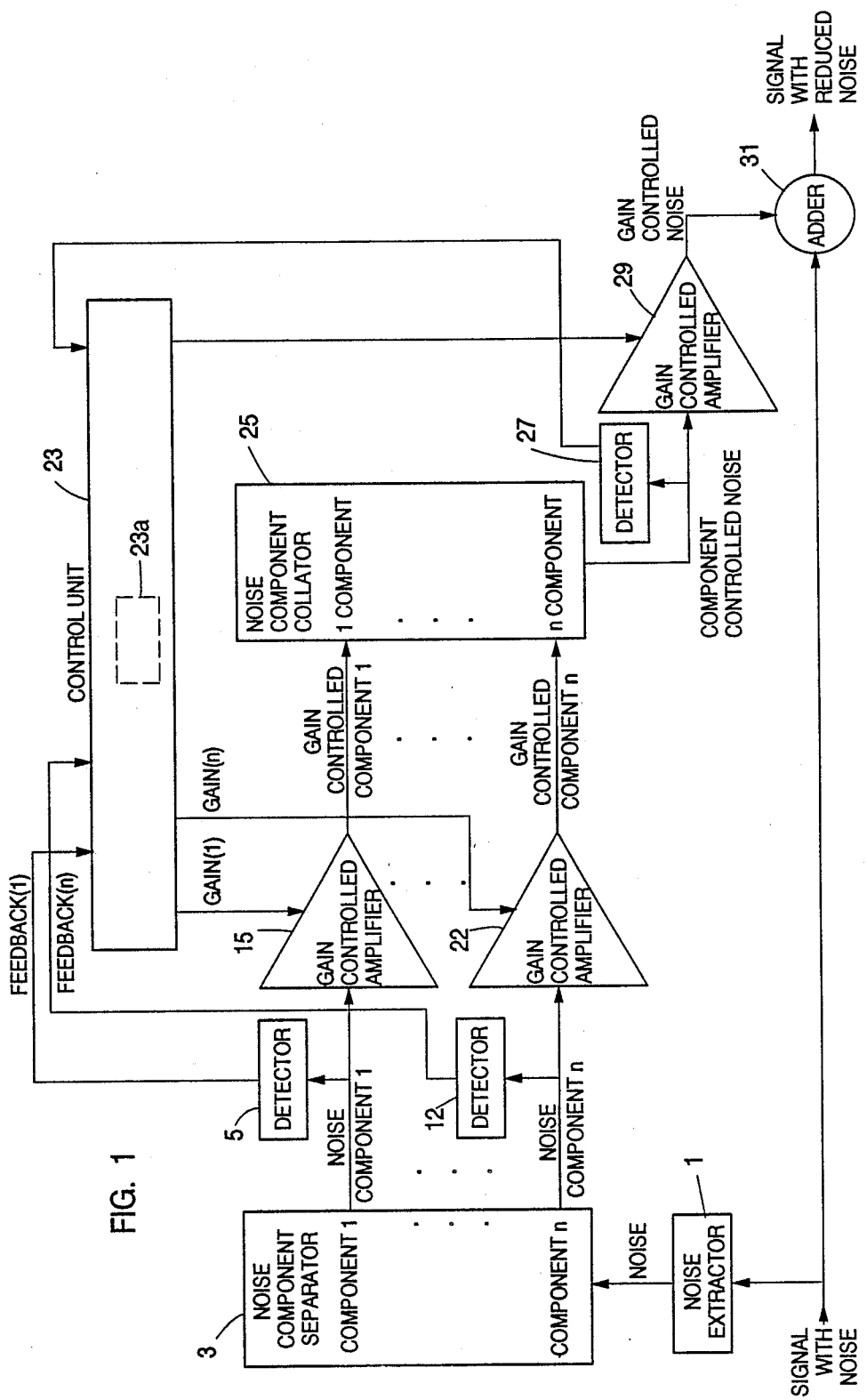

AUTOMATIC NOISE REDUCTION FOR INDIVIDUAL FREQUENCY COMPONENTS OF A SIGNAL

FIELD OF THE INVENTION

The invention relates to automatic noise reduction systems and methods for processing signals such as video signals. More particularly, the invention is a system and method for performing automatic noise reduction on the individual frequency components of signals such as video signals.

BACKGROUND OF THE INVENTION

Conventional automatic noise reduction systems detect the amplitude or frequency content (or both the amplitude and frequency content) of electronic noise extracted from a noisy signal, and perform appropriate, desired, or programmed corrections on the noisy signal in response to the detected noise content. Conventional automatic noise reduction circuitry measures the noise content of an input signal, uses the measured data as feedback to adjust the parameters of conventional noise reduction circuitry automatically, and processes the input signal using the so-adjusted noise reduction circuitry.

In the field of color television signal processing, it is common to control as many as twenty-four parameters (each parameter having eight possible values) in generating and transmitting an R, G, B color television signal. Thus, the signal to noise characteristics of a color television signal may rapidly vary with time, for example as different electronic sources are employed, or scene lighting or scenery content changes occur.

Conventional automatic noise reduction circuitry is capable of responding, to a limited degree, to the changing signal to noise characteristics of a television signal without human intervention. However, the signal to noise characteristics of noise reduced output signals produced by conventional automatic noise reduction circuits are poor because such conventional circuits employ feedback signals indicative only of the average noise characteristics (over the entire frequency spectrum) of the noisy signal being processed. Thus, conventional automatic noise reduction circuitry will not vary noise reduction parameters in response to changes in the noise characteristics of the signal being processed, if such changes do not affect the average noise parameter indicated by such feedback signals.

It has not been known until the present invention how to improve the quality of the output signal of an automatic noise reduction system by independently processing the frequency components of the input signal to such system. Nor has it been known how to efficiently to employ a set of feedback signals in an automatic noise reduction system, where each feedback signal is indicative of the noise characteristics of a different frequency component of a noisy signal being processed.

SUMMARY OF THE INVENTION

The method of the invention includes the steps of separating a noise signal into frequency components, then automatically performing noise reduction on the individual frequency components, and then recombining the processed frequency components to generate an output noise signal. The noise reduction parameters for each frequency component may be independently set. The output noise signal generated during performance of the invention will typically be recombined with a signal (such as a television signal) from which the input noise signal for the invention was originally extracted.

The system of the invention implements the method of the invention. In a preferred embodiment, the input noise signal supplied to the system of the invention is generated by subtracting two adjacent frames of a television signal. In a preferred embodiment, the invention includes: circuitry for implementing a Walsh-Hadamard transform to separate the input noise signal into a set of frequency components; a set of automatic gain controlled amplifiers for independently performing noise reduction on each frequency component; and a noise component collator for combining the processed frequency components to generate a "component controlled noise signal". Each automatic gain controlled amplifier is independently controlled in response to a feedback signal representing the noise characteristics of a different frequency component of the input noise signal. Preferably, the system of the invention also includes a gain controlled amplifier for transforming the component controlled noise signal into a gain controlled noise output signal. The gain controlled noise output signal may subsequently be recombined with the television frame signal from which the input noise signal was extracted.

BRIEF DESCRIPTION OF THE DRAWING

FIG. 1 is a block diagram of a preferred embodiment of the system of the invention.

DETAILED DESCRIPTION OF THE PREFERRED EMBODIMENTS

A preferred embodiment of the system of the invention is shown in FIG. 1. The noise signal to be processed by the system emerges from noise extraction unit 1. In an embodiment in which the invention processes a conventional television signal, unit 1 will preferably be a conventional circuit known as a one television frame differentiator. Such a conventional circuit accepts a television signal, generates a delayed television signal therefrom (by delaying the original signal by a period corresponding to one television signal frame), and subtracts the delayed television signal from the original signal. In an embodiment in which the invention processes a digital high definition television signal comprising eight parallel bit streams, unit 1 will preferably be a digital television frame differentiator suitable for processing such a digital television signal to generate a set of parallel bit streams representing the digitized noise portion of the digital television signal.

The noise signal emerging from unit 1 is separated into "n" frequency components (where n is a positive integer greater than one) in noise component separator 3. In one preferred embodiment, separator 3 includes conventional circuitry for performing a Walsh-Hadamard time domain to frequency domain transform on th noise signal supplied thereto, and separating the transformed noise signal into n frequency components, each having a distinct frequency spectrum. In a preferred embodiment, eight such frequency components are generated (so that n=8). For simplicity, it will be assumed in the subsequent description of FIG. 1 that separator 3 generates eight frequency components (so that n=8).

Each of identical detectors 5 through 12 receives a different one of the eight frequency components emerging from separator 3. Each of identical gain-controlled amplifiers 15 through 22 also receives a different one of the eight frequency components emerging from separator 3.

Each detector measures a parameter characterizing the amplitude of the frequency component it receives, and supplies a feedback signal indicative of the measured parameter to control unit 23. In a preferred embodiment, each of detectors 5 through 12 is a digital comparator, and includes a low-pass filter for filtering the feedback signal to be supplied to control unit 23 (to provide a long-term valuation of its corresponding noise component).

Control unit 23 is a programmed microprocessor including a memory unit 23a. Control unit 23 is programmed to supply a gain control signal to each of amplifiers 15 through 22 in response to each of the feedback signals received from detectors 5 through 12, respectively. Each of detectors 5 through 12 is associated with a minimum (threshold) noise value, and each of amplifiers 15 through 22 is associated with range of possible gain values bounded by a minimum gain value and a maximum gain value. All such minimum and maximum values (noise values and gain values) are determined by the system operator in accordance with the expected average noise levels for each of the frequency components emerging from unit 3 under expected operating conditions, and all gain values in the range and threshold noise values are written into memory unit 23a (for example, by setting appropriate switches). For example, if the "nth" frequency component supplied to detector 12 will likely have large amplitude, all parameters for that component will be selected to be correspondingly high.

Control unit 23 is programmed to perform the following algorithm: (a) accept the operator-specified initialization parameters (the above-mentioned noise values and gain values) and determine a nominal gain control value for each frequency component (with each nominal gain control value selected from the operator-specified gain value range); (b) select the next frequency component to be tested; (c) compare the detector-supplied feedback signal (for the selected frequency component) with the system operator-supplied threshold noise signal (for the selected frequency component); (d) if the threshold signal level does not exceed the feedback noise signal level, generate (and supply to the gain controlled amplifier for the selected frequency component) a gain control signal having a gain value incrementally higher than the nominal gain control value, with the constraint that such incrementally higher gain level must not exceed the operator-specified maximum gain value; (e) if the feedback signal level is less than the threshold noise signal level, generate (and supply to the gain controlled amplifier for the selected frequency component) a gain control signal having a gain value incrementally lower than the nominal gain control value, with the constraint that such incrementally lower gain level must not fall below the operator-specified minimum gain value; and (f) repeat steps (b) through (e) for each of the frequency components to be tested.

In a preferred embodiment, each of gain-controlled amplifiers 15 through 22 is a writable memory unit (preferably a random-access memory unit) employed in a standard manner as a data look-up table. In this embodiment, control unit 23 writes a desired set of gain values into each of amplifiers 15-22 so that each set of gain values comprises a data look-up table in the relevant amplifier. Control unit 23 then causes each amplifier to apply the appropriate gain value (from the look-up table stored therein) to the frequency component received by each such amplifier in accordance with the algorithm set forth in the preceding paragraph.

In a preferred embodiment, each of detectors 5 through 12 is also a writable memory unit (preferably a random-access memory unit) employed in a standard manner as a data look-up table. In this embodiment, control unit 23 writes a desired set of noise level values into each of detectors 5-12 so that each set of noise level values comprises a data look-up table in the relevant detector. Each detector then functions as a digital comparator to output the noise level value (from the set of values stored therein) corresponding to the frequency component received by each such detector. Preferably, each detector will output a special bit indicative of whether the incident frequency component's noise level exceeds the noise level threshold (currently stored in the detector) for such frequency band. Preferably, each detector bit is low-pass filtered before it is supplied as a feedback signal to control unit 23.

The gain controlled component signals emerging from amplifiers 15-22 are supplied to noise component collator unit 25. A conventional inverse Walsh-Hadamard transformation unit is suitable for use as unit 25, in an embodiment in which separator unit 3 is a Walsh-Hadamard transformation unit. Unit 25 will combine the individual gain controlled component signals to generate a component controlled noise signal whose frequency amplitude spectrum is determined by the amount of gain applied by each of gain controlled amplifiers 15-22 to the frequency components of the input noise signal emerging from unit 1.

The component controlled noise signal may be directly added to the unprocessed, noisy signal in addition unit 31. Alternatively, the component controlled noise signal may be supplied to noise level detector 27 and to gain controlled amplifier 29, as shown in FIG. 1. Detector 27 measures a parameter characterizing the amplitude of the component controlled noise signal, and supplies a feedback signal indicative of the measured parameter to control unit 23. Control unit 23 may be programmed in a conventional manner (i.e., as in conventional automatic noise reduction systems) to supply a gain control signal to amplifier 29 in response to the feedback signal received from detector 25. Detector 27 and amplifier 29 may be implemented as writable memory units, just as detectors 5-12 and amplifiers 15-22, and employed in a standard manner as data look-up tables. The gain controlled noise signal emerging from amplifier 29 will have an average amplitude determined by the gain applied by amplifier 29, while the relative amplitudes of its frequency component is determined by the gains applied by the individual amplifiers 15-22.

The gain controlled noise signal from amplifier 29 may be supplied to adder unit 31, in which it is combined with the unprocessed, noisy signal (which may be a television signal) whose noise component is extracted in unit 1. It will be appreciated that the average amplitude of the noise signal emerging from unit 1 (and hence the average amplitude of the noise signal emerging from amplifier 29) will have opposite sign as the average amplitude of the unprocessed, noisy signal supplied as the input to unit 1. Thus, addition of the gain controlled noise signal from amplifier 29 to the unprocessed, noisy signal will partially cancel the noise portion of the unprocessed, noisy signal.

A computer programmer of ordinary skill in the art will be able readily to generate appropriate software (or firmware) for programming control unit 23 to implement the above-described operations.

The foregoing is merely illustrative and explanatory of the invention. Various changes in the components and other details of the embodiments described herein may be within the scope of the appended claims.

What is claimed is:

1. An automatic noise reduction method for processing an input signal having a noise portion for each of a set of frequency components, signals indicative of a minimum noise value for each frequency component in the set, and signals indicative of a range of gain values bounded by a minimum gain value and a maximum gain value for each frequency component in the set, including the steps of:
   (a) generating a feedback signal indicative of the amplitude of one of the noise portions having a selected frequency component;
   (b) generating a gain control signal for the noise portion having said selected frequency component, in response to the feedback signal for said noise portion;
   (c) generating a gain controlled component signal by amplifying the noise portion having said selected frequency to an amplitude determined by the gain control signal for said noise portion;
   (d) repeating steps (a) through (c) for each frequency component in the set; and
   (e) combining the gain controlled component signals to generate a component controlled noise signal, in a manner so that the amplitude of each frequency component of the component controlled noise signal is determined by the amplitude of the gain controlled component signal for said frequency component.

2. The method of claim 1, also including the step of:
   (f) selecting a nominal gain control value for each frequency component from the range of gain values; and wherein step (b) includes the step of:
   (g) comparing the feedback signal for noise portion having said selected frequency component with the minimum noise value for said selected frequency component, and if the level of the threshold signal does not exceed the level of the feedback signal, causing the gain control signal to have an incrementally larger gain control value than the nominal gain control value, with the constraint that such incrementally larger gain level must not exceed the maximum gain value, and if the level of the feedback signal is less than the threshold noise signal level, causing the gain control signal to have an incrementally smaller gain control value than the nominal gain control value, with the constraint that such incrementally smaller gain level must not fall below the minimum gain value.

3. The method of claim 1, wherein the noise portions comprise a noise component of the input signal, and also including the step of:
   (h) separating the input signal into its noise portions by processing the input signal's noise component in a separator including a Walsh-Hadamard time domain to frequency domain transformation unit.

4. The method of claim 1, wherein the input signal is a television signal.

5. The method of claim 1, also including the step of:
   (i) adding together the component controlled noise signal and the input signal.

6. The method of claim 5, wherein the noise portions comprise a noise component of the input signal, and wherein the average amplitude of the input signal's noise component has opposite sign from the average amplitude of the component controlled noise signal, so that performance of step (i) will partially cancel the input signal's noise component.

7. The method of claim 1, also including the steps of:
   (j) generating a feedback signal indicative of the amplitude of the component controlled noise signal;
   (k) generating a final gain control signal for the component controlled noise signal, in response to the feedback signal generated in step (j); and
   (l) generating a gain controlled noise signal by amplifying the component controlled noise signal to an amplitude determined by the final gain control signal.

8. The method of claim 7, also including the step of:
   (m) adding together the gain controlled noise signal and the input signal.

9. The method of claim 8, wherein the noise portions comprise a noise component of the input signal, and wherein the average amplitude of the input signal's noise portions has opposite sign from the average amplitude of the gain controlled noise signal, so that performance of step (m) will partially cancel the input signal's noise portions.

10. An automatic noise reduction system, for processing an input signal having a noise portion for each of a set of frequency components, signals indicative of a minimum noise value for each frequency component in the set, and signals indicative of a range of gain values bounded by a minimum gain value and a maximum gain value for each frequency component in the set, including:
   (a) a set of detectors, each for generating a feedback signal indicative of the amplitude of one of th noise portions;
   (b) a control unit connected to the detectors, for receiving the feedback signals and generating a gain control signal for each noise portion in response to the feedback signals;
   (c) a set of gain controlled amplifiers, each for receiving and amplifying one of the noise portions, wherein each said gain controlled amplifier is connected to the control unit and receives one of the gain control signals, and wherein each said gain controlled amplifier generates a gain controlled component signal by amplifying said one of the noise portions to an amplitude determined by the gain control signal for said one of the noise portions; and
   (d) a noise component collator for receiving the gain controlled component signals, and for combining said gain controlled component signals to generate a component controlled noise signal in a manner so that the amplitude of each frequency component of the component controlled noise signal is determined by the amplitude of the gain controlled component signal for said frequency component.

11. The system of claim 10, wherein the control unit supplies a nominal gain control signal to each said gain controlled amplifier, each said nominal gain control signal having amplitude corresponding to a value from the range of gain values, and wherein the control unit compares the feedback signal for each noise portion with the minimum noise value for said each noise portion, and if the level of the threshold signal does not exceed the level of the feedback signal, causes the gain control signal to have an incrementally larger gain control value than does the nominal gain control signal, with the constraint that such incrementally larger gain value must not exceed the maximum gain value, and if the feedback signal level is less than the threshold noise signal level, causing the gain control signal to have an incrementally smaller gain control value than does the nominal gain control value, with the constraint that such incrementally smaller gain value must not fall below the minimum gain value.

12. The system of claim 10, wherein the noise portions comprise a noise component of the input signal, and also including:
 (e) a separator including a Walsh-Hadamard time domain to frequency domain transformation unit for separating the input signal's noise component into its noise portions.

13. The system of claim 10, wherein the control unit is a programmed microprocessor.

14. The system of claim 13, wherein said each detector is a writable memory unit for storing a data look-up table, and said each feedback signal is selected from data from said look-up table.

15. The system of claim 13, wherein said each gain controlled amplifier is a writable memory unit for storing a data look-up table, and said each feedback signal is selected from data from said look-up table.

16. The system of claim 10, wherein the input signal is a television signal.

17. The system of claim 10, also including:
 (f) an addition unit for adding together the component controlled noise signal and the input signal.

18. The system of claim 17, wherein the noise portions comprise a noise component of the input signal, and wherein the average amplitude of the input signal's noise component has opposite sign from the average amplitude of the component controlled noise signal, so that addition of the component controlled noise signal and the input signal will partially cancel the input signal's noise component.

19. The system of claim 10, also including
 (g) detector for generating a final feedback signal indicative of the amplitude of the component controlled noise signal;
 (h) means in said control unit for receiving the final feedback signal and generating a final gain control signal for the component controlled noise signal, in response to the final feedback signal; and
 (i) a final gain controlled amplifier for receiving and amplifying the component controlled noise signal, wherein the final gain controlled amplifier is connected to the control unit and receives the final gain control signal, and wherein the final gain controlled amplifier generates a gain controlled noise signal by amplifying the component controlled noise signal to an amplitude determined by the final gain control signal.

20. The system of claim 19, also including:
 (j) an addition unit for adding together the gain controlled noise signal and the input signal.

21. The system of claim 20, wherein the noise portions comprise a noise component of the input signal, and wherein the average amplitude of the input signal's noise component has opposite sign from the average amplitude of the gain controlled noise signal, so that addition of the gain controlled noise signal and the input signal will partially cancel the input signal's noise component.

22. A system for partially reducing the noise component of a noisy signal, where the noise component comprises a noise portion for each of a number of frequency components, including:
 (a) a set of detectors, each for generating a feedback signal indicative of the amplitude of one of the noise portions;
 (b) a microprocessor connected to the detectors, where said microprocessor includes a memory unit, and has stored in the memory unit a set of signals indicative of a minimum noise value for each frequency component, and a set of signals indicative of a range of gain values bounded by a minimum gain value and a maximum gain value for each frequency component in the set, and wherein the microprocessor is programmed to receive the feedback signals and to generate a gain control signal for each noise portion in response to the feedback signals;
 (c) a set of gain controlled amplifiers, each for receiving and amplifying one of the noise portions, wherein each said gain controlled amplifier is connected to the microprocessor for receiving one of the gain control signals, and wherein each said gain controlled amplifier generates a gain controlled component signal by amplifying said one of the noise portions to an amplitude determined by the gain control signal for said one of the noise portions; and
 (d) a noise component collator for receiving the gain controlled component signals, and for combining said gain controlled component signals to generate a component controlled noise signal in a manner so that the amplitude of each frequency component of the component controlled noise signal is determined by the amplitude of the gain controlled component signal for said frequency component.

23. The system of claim 22, also including:
 (e) a detector for generating a final feedback signal indicative of the amplitude of the component controlled noise signal, wherein the microprocessor is programmed to receive the final feedback signal and generate a final gain control signal for the component controlled noise signal in response to the final feedback signal; and
 (f) a final gain controlled amplifier for receiving and amplifying the component controlled noise signal, wherein the final gain controlled amplifier is connected to the microprocessor and receives the final gain control signal, and wherein the final gain controlled amplifier generates a gain controlled noise signal by amplifying the component controlled noise signal to an amplitude determined by the final gain control signal.

24. The system of claim 23, also including:
 (g) an addition unit for adding together the gain controlled noise signal and the noisy signal.

25. The system of claim 24, wherein the noise portions comprise a noise component of the noisy signal, and wherein the average amplitude of the noisy signal's noise component has opposite sign from the average amplitude of the gain controlled noise signal, so that addition of the gain controlled noise signal and the noisy signal will partially cancel the noisy signal's noise component.

26. The system of claim 22, where the noisy signal is a television signal.

27. The system of claim 22, where the noisy signal is a digitized television signal.

* * * * *